(12) United States Patent
Lee et al.

(10) Patent No.: US 7,894,379 B2
(45) Date of Patent: Feb. 22, 2011

(54) KEY RECOGNITION METHOD AND WIRELESS COMMUNICATION SYSTEM

(75) Inventors: Chih-Fang Lee, Tainan County (TW); Chin-Hao Chang, Hsinchu (TW); Ming-Kuei Chou, Yun-lin County (TW)

(73) Assignee: Arcadyan Technology Corporation, Hsinchu (TW)

(*) Notice: Subject to any disclaimer, the term of this patent is extended or adjusted under 35 U.S.C. 154(b) by 740 days.

(21) Appl. No.: 11/902,017

(22) Filed: Sep. 18, 2007

(65) Prior Publication Data

US 2008/0285498 A1  Nov. 20, 2008

(30) Foreign Application Priority Data

May 14, 2007  (TW) .............. 96117094 A

(51) Int. Cl.
*H04Q 7/00*  (2006.01)
(52) U.S. Cl. .................................... 370/313
(58) Field of Classification Search ........... None
See application file for complete search history.

(56) References Cited

U.S. PATENT DOCUMENTS 5,416,801 A * 5/1995 Chouly et al. ............ 375/260
5,850,444 A * 12/1998 Rune ........................ 705/79
6,956,891 B2 * 10/2005 Tan ........................... 375/140

* cited by examiner

Primary Examiner—Ayaz R Sheikh
Assistant Examiner—Blanche Wong
(74) Attorney, Agent, or Firm—Birch, Stewart, Kolasch & Birch, LLP

(57) ABSTRACT

A key recognition method and a key recognition system are applied to a wireless bridging apparatus and a terminal apparatus with a wireless communication function. When a user uses the wireless bridging apparatus at a first time, the user cannot connect the wireless bridging apparatus to a wireless network through the terminal apparatus until key verification between the terminal apparatus and the wireless bridging apparatus has been conducted and passed. The key recognition method includes the steps of: transmitting, by the wireless bridging apparatus, an original code to the terminal apparatus; encoding, by the terminal apparatus, the original code to obtain a transformed code; encoding, by the terminal apparatus, the original code and the transformed code to obtain a recognition code; and transmitting, by the terminal apparatus, the recognition code to the wireless bridging apparatus for verification and communication establishment.

12 Claims, 3 Drawing Sheets

KEY RECOGNITION METHOD AND WIRELESS COMMUNICATION SYSTEM

CROSS REFERENCE TO RELATED APPLICATIONS

This Non-provisional application claims priority under 35 U.S.C. §119(a) on Patent Application No(s). 096117094 filed in Taiwan, Republic of China on May 14, 2007, the entire contents of which are hereby incorporated by reference.

BACKGROUND OF THE INVENTION

1. Field of Invention

The invention relates to a key recognition method and a wireless communication system, and, in particular, to a key recognition method and a wireless communication system capable of generating a recognition key or a recognition code automatically.

2. Related Art

In the information exploding age, the information transmission has become an indispensable portion of the daily life. The information transmission is mainly achieved through a wired network and a wireless network. The wireless communication has become the key point in the development of the modem technology because the cost and the time of arranging the network cable can be saved and the wireless communication is free from the limitations of the obstructers on the ground.

In the typical wireless network, it is possible to conduct data transmission between different terminal apparatuses through a wireless network apparatus, such as a wireless bridging apparatus. In addition, in order to keep the security of the wireless network, some encrypting technologies, such as WEP (Wired Equivalent Privacy) and WPA (Wi-Fi Protected Access) under the IEEE 802.11 specification, are also developed to prevent the transmitted data from being stolen or prevent the Intranet from being hacked. In general, a verification code (or the so-called key) may be set at the end of the wireless bridging apparatus in advance. When a user wants to log-in to the wireless bridging apparatus, he or she has to input a recognition code at the end of the terminal apparatus, and the recognition code is transmitted to the wireless bridging apparatus for verification. Thus, the user cannot be allowed to log-in until the wireless bridging apparatus has verified that the verification code matches with the recognition code.

After the user has purchased the wireless bridging apparatus, a driver has to be firstly installed using, for example, an optical disk having an installation program. Most installation procedures are described in the following. After the terminal apparatus owned by the user and the wireless bridging apparatus are turned on, the terminal apparatus receives a signal outputted from the wireless bridging apparatus and knows that the wireless bridging apparatus exists and can be logged in. The installation program asks the user to input a serial number, and the user follows indications to input the complete serial number, which is transmitted to the wireless bridging apparatus. The wireless bridging apparatus judges whether the information contained in the signal transmitted by the terminal apparatus is the same as that contained in the recognition code. If they are the same, the user is allowed to log-in; otherwise, the user is not allowed to log-in. However, such the installation procedures make the user feel complicated, especially when an input error occurs. In addition, the serial number tends to be exposed so that the privacy is poor.

Therefore, it is an important subject to provide a key recognition method and a wireless communication system, through which the user can conduct key recognition with the enhanced privacy.

SUMMARY OF THE INVENTION

In view of the foregoing, the invention is to provide a key recognition method and a wireless communication system, through which key recognition between a terminal apparatus owned by a user and a wireless bridging apparatus may be conducted.

To achieve the above, a key recognition method of the invention is applied to a wireless bridging apparatus and a terminal apparatus with a wireless communication function. The method includes the following steps of: transmitting an original code by the wireless bridging apparatus to the terminal apparatus, encoding the original code by the terminal apparatus to obtain a transformed code, encoding the original code and the transformed code by the terminal apparatus to obtain a recognition code, transmitting the recognition code by the terminal apparatus to the wireless bridging apparatus, and verifying the recognition code by the wireless bridging apparatus. Herein, a communication connection between the terminal apparatus and the wireless bridging apparatus is established when the recognition code is verified as a correct code.

To achieve the above, a wireless communication system of the invention includes a wireless bridging apparatus and a terminal apparatus. The wireless bridging apparatus conducts a wireless function. The wireless bridging apparatus has an original code and a verification code, and transmits the original code in a wireless transmitting manner. The terminal apparatus has a wireless communication module, which receives the original code outputted from the wireless bridging apparatus. The terminal apparatus encodes the original code into a transformed code, and encodes the original code and the transformed code into a recognition code. The recognition code is transmitted to the wireless bridging apparatus through the wireless communication module.

As mentioned hereinabove, the key recognition method and the wireless communication system according to the invention have the following advantages. The terminal apparatus encodes the received original code into the recognition code, and transmits the recognition code to the wireless bridging apparatus for verification. After the verification has passed, the communication connection between the wireless bridging apparatus and the terminal apparatus is established, and the terminal apparatus can log-in to the wireless bridging apparatus. Compared with the related art, the user does not have to manually input any serial number or information code in this invention, and the overall operation of generating the recognition code is conducted automatically so that the key recognition between the wireless bridging apparatus and the terminal apparatus can be conducted. Thus, it is possible to prevent the serial number or any other information code, which has to be previously inputted by the user, from being exposed, so that the privacy can be enhanced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
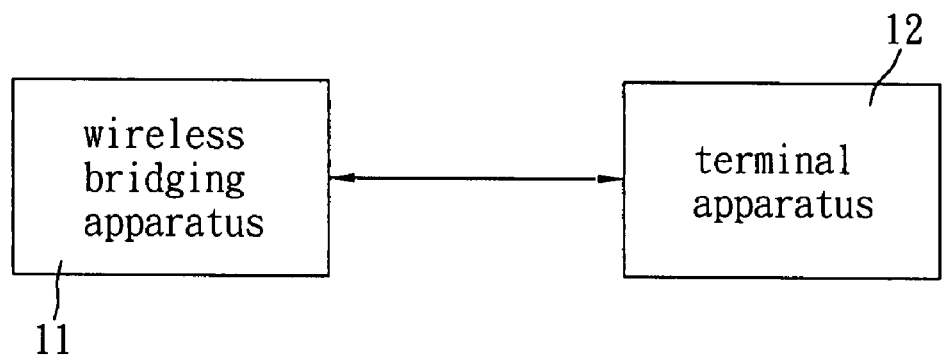
FIG. 1 is a schematic illustration showing a wireless communication system according to a preferred embodiment of the invention.

Referring to FIG. 1, a wireless communication system 1 according to a preferred embodiment of the invention includes a plurality of wireless bridging apparatuses 11, and a terminal apparatus 12 with a wireless communication function. In this embodiment, the number of each of the wireless bridging apparatus 11 and the terminal apparatus 12 is equal to, for example but not limited to, 1.

The wireless bridging apparatus 11 of this embodiment is an apparatus, such as a wireless access point (AP), a wireless router or a wireless bridge, having the wireless network function of connecting two Intranets, or of bridging a wired network with a wireless network. In addition, the wireless bridging apparatus 11 in this embodiment before being shipped out has been built with a recognition key or a verification code.

The terminal apparatus 12 of this embodiment may be a personal computer, a mobile communication apparatus or a personal digital assistant (PDA). In addition, the terminal apparatus 12 has a wireless communication module for receiving and transmitting a wireless communication signal. Herein, the wireless communication module may be a chipset with the wireless communication function. In this embodiment, the specification of the wireless communication may be Wi-Fi, such as IEEE 820.11a/b/g and the like, specified by IEEE (Institute of Electrical and Electronics Engineers). In addition, the terminal apparatus 12 is connected to the wireless network through the wireless bridging apparatus 11.

Before a communication connection between the terminal apparatus 12 and the wireless bridging apparatus 11 is established, the terminal apparatus 12 and the wireless bridging apparatus 11 have to verify with each other. More particularly, when the user uses the wireless bridging apparatus 11 at the first time, the terminal apparatus 12 and the wireless bridgin g apparatus 11 have to verify with each other. In this case, the terminal apparatus 12 has to transmit a correct recognition code to the wireless bridging apparatus 11, and the communication connection between the terminal apparatus 12 and the wireless bridging apparatus 11 cannot be established until the terminal apparatus 12 has passed the verification of the wireless bridging apparatus 11. In the embodiment, the step of manually inputting the recognition code can be omitted, and the recognition code is generated automatically and automatically transmitted to the wireless bridging apparatus 11 for verification so that the key recognition efficiency is enhanced.

Figure 2:
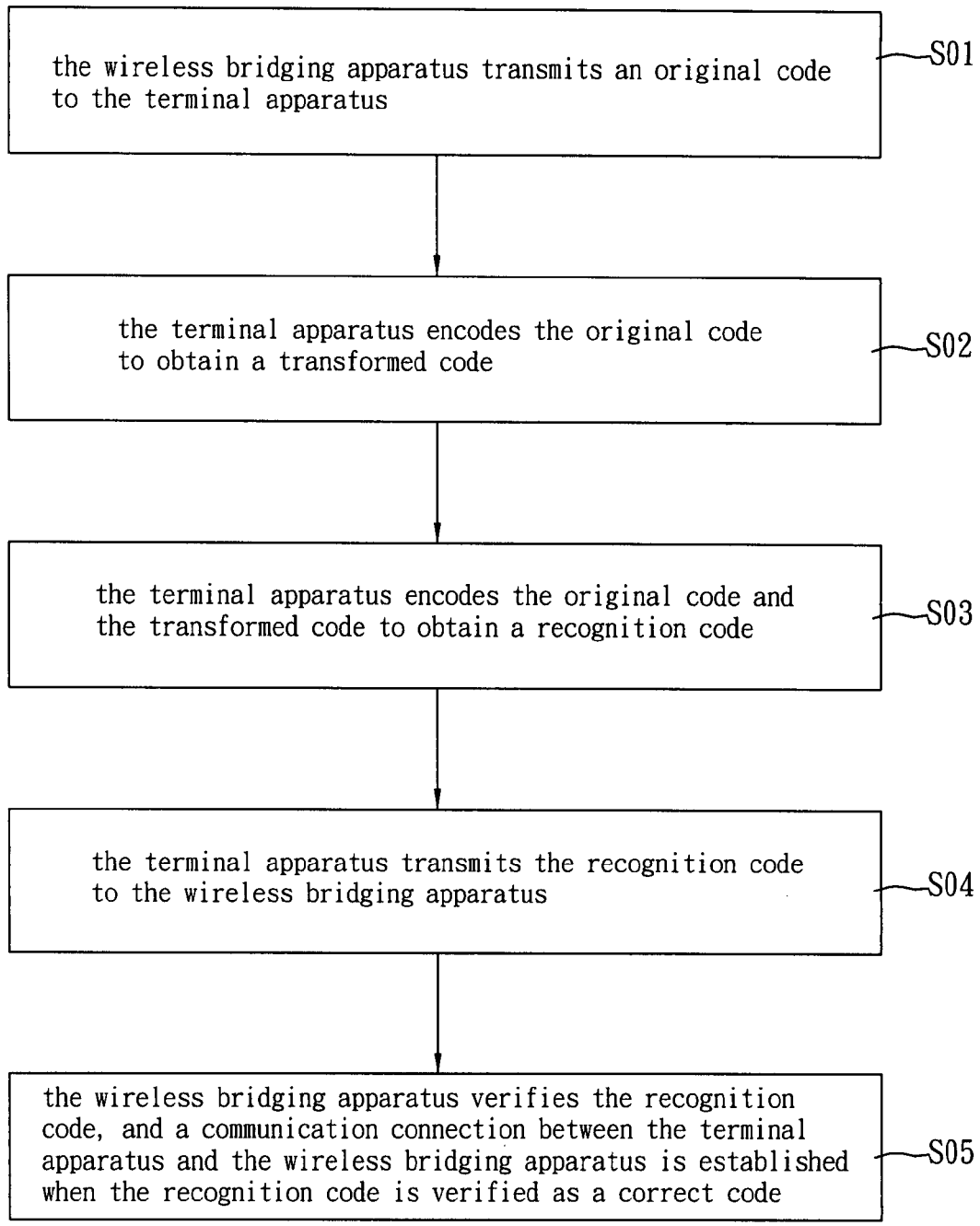
FIG. 2 is a flow chart showing a key recognition method according to the preferred embodiment of the invention.

FIG. 2 shows steps of a key recognition method according to the preferred embodiment of the invention. When the user uses the wireless bridging apparatus 11 at the first time, the terminal apparatus 12 and the wireless bridging apparatus 11 have to verify with each other according to the verification method including the following steps. In step S01, the wireless bridging apparatus 11 transmits an original code to the terminal apparatus 12. In step S02, the terminal apparatus 12 encodes the original code to obtain a transformed code. In step S03, the terminal apparatus 12 encodes the original code and the transformed code to obtain a recognition code. In step S04, the terminal apparatus 12 transmits the recognition code to the wireless bridging apparatus 11. In step S05, the wireless bridging apparatus 11 verifies the recognition code. When the recognition code is verified as a correct code, a communication connection between the terminal apparatus 12 and the wireless bridging apparatus 11 is established. After the verification of the wireless bridging apparatus 11 has passed, it represents that the terminal apparatus 12 and the wireless bridging apparatus 11 have successfully verified with each other, and the user can start to use the wireless service provided by the wireless bridging apparatus 11.

Figure 3:
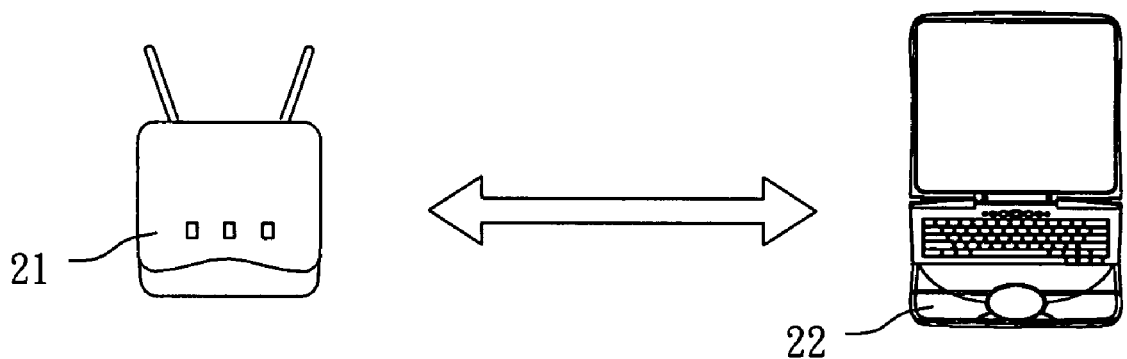
FIG. 3 is a schematic illustration showing a wireless communication system according to another preferred embodiment of the invention.

The wireless communication system and the key recognition method mentioned hereinabove will be described according to the following example. Referring to FIG. 3, a wireless communication system 2 includes a wireless access point (AP) 21 and a notebook computer 22. The wireless access point 21 pertains to one aspect of the wireless bridging apparatus 11, and the notebook computer 22 pertains to one aspect of the terminal apparatus 12.

The key recognition method will be described in detail with reference to the wireless communication system 2.

First, the wireless access point 21 and the notebook computer 22 are powered on, and the distance from the wireless access point 21 to the notebook computer 22 is kept within a transmissible range. The notebook computer 22 includes an optical disk or a driving device, and the optical disk stores a program for performing the key recognition method according to this embodiment. This embodiment conducts the key recognition method by executing the program stored in the optical disk.

After the wireless access point 21 and the notebook computer 22 are powered on, the wireless access point 21 transmits a signal, which includes an original code. The notebook computer 22 receives the signal outputted from the wireless access point 21 through its wireless communication module. In this embodiment, the original code is a media access control (MAC) address of the wireless access point 21, which has six bytes and may be represented as "M7 M8 M9 M10 M11 M12" in a hexadecimal manner.

After the notebook computer 22 receives the original code outputted from the wireless access point 21, the notebook computer 22 encodes the original code to obtain a transformed code. In this embodiment, a central processing unit (CPU) of the notebook computer 22 executes an encoding module, such as a program code, stored in the optical disk to conduct the encoding process. In this embodiment, the hexadecimal MAC address is transformed into a decimal transformed code. Herein, the decimal transformed code is a product serial number of the wireless access point 21 and may be represented as "S6 S7 S8 S9 S10".

Next, the notebook computer 22 encodes the original code and the transformed code to obtain a recognition code. In this embodiment, the CPU of the notebook computer 22 executes a recognition module, which is also a program code, stored in the optical disk to encode the original code and the transformed code. In addition, the encoding module and the recognition module are stored in the optical disk in this embodiment. Of course, the encoding module and the recognition module may also be stored in a certain storage device.

In this embodiment, the recognition code is obtained by conducting a logic operation according to the original code and the transformed code, and the logic operation involves at least one operator, such as an AND operator or an XOR operator.

The logic operation used in this embodiment will be described with reference to one practical example. Before the recognition code is generated, a plurality of key seeds, such as K1 and K2, has to be generated. The relationships between the key seeds K1 and K2, the original code and the transformed code are listed as follows:

K1=last byte of (S7+S8+M11+M12); and
K2=last byte of (M9+M10+S9+S10).

That is, K1 is the last byte of the value generated after the logic operation is performed according to S7, S8, M1 and M12 by the OR operator; and K2 is the last byte of the value generated after the logic operation is performed according to M9, M10, S9 and S10 by the OR operator. After the key seeds K1 and K2 are obtained, the recognition code can be calculated. Herein, the recognition code may be represented as "X1 Y1 Z1 X2 Y2 Z2 X3 Y3 Z3" and has the following relationships:

X1=K1 XOR S10;
X2=K1 XOR S9;
X3=K1 XOR S8;
Y1=K2 XOR M10;
Y2=K2 XOR M11;
Y3=K2 XOR M12;
Z1=M11 XORS10;
Z2=M12 XOR S9; and
Z3=K1 XOR K2.

That is, X1 is the value generated after the logic operation is performed according to K1 and S10 by the XOR operator, and the other values of the recognition code are generated analogically without detailed descriptions. According to the above-mentioned logic operation, the recognition code after the operation also changes even if the original code outputted by the wireless access point 21 only changes one byte. Thus, the key recognition privacy can be enhanced. Of course, more encoding transformation procedures and logic operations may be conducted on the original code to enhance the privacy in this embodiment.

After the recognition code is obtained by the operation, the notebook computer 22 transmits the recognition code to the wireless access point 21 through the wireless communication module, and then the wireless access point 21 conducts the final verification operation according to the recognition code. The wireless access point 21 itself stores the verification code the same as the recognition code. This verification compares the recognition code outputted from the notebook computer 22 with the verification code stored in the wireless access point 21 to determine whether they match with each other or not. If they match with each other, it represents that the notebook computer 22 has passed the verification, and the communication connection between the wireless access point 21 and the notebook computer 22 may be established. Otherwise, the communication connection between the wireless access point 21 and the notebook computer 22 cannot be established. In this embodiment, the recognition code outputted from the notebook computer 22 is generated by way of automatic calculation. Thus, the wireless access point 21 and the notebook computer 22 can verify with each other without any other key or data being inputted by the user.

To be noted, the key recognition method of this embodiment is applied to the user's installation of the driver for the wireless access point 21 and to the establishment of the communication connection between the notebook computer 22 and the wireless access point 21.

In addition, the key recognition method of this embodiment may also be applied to the normal condition. When a certain user wants to log-in to the wireless access point 21, he or she can use this method to generate the recognition code automatically so that the object of logging in the wireless access point 21 can be achieved. In this embodiment, after the verification operation between the wireless access point 21 and the notebook computer 22 is finished, the notebook computer 22 can be connected to the wireless access point 21 in a wireless manner, and the verification code or seeds in the wireless access point 21 may be modified.

In summary, the key recognition method and the wireless communication system according to the invention have the following advantages. The terminal apparatus encodes the received original code into the recognition code, and transmits the recognition code to the wireless bridging apparatus for verification. After the verification has passed, the communication connection between the wireless bridging apparatus and the terminal apparatus is established, and the terminal apparatus can log-in to the wireless bridging apparatus. Compared with the prior art, the user does not have to manually input any serial number or information code in this invention, and the overall operation of generating the recognition code is conducted automatically so that the key recognition between the wireless bridging apparatus and the terminal apparatus can be conducted. Thus, it is possible to prevent the serial number or any other information code, which has to be previously inputted by the user, from being exposed, so that the privacy can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A key recognition method applied to a wireless bridging apparatus and a terminal apparatus with a wireless communication function, the method comprising steps of:

transmitting an original code by the wireless bridging apparatus to the terminal apparatus;

encoding the original code by the terminal apparatus to obtain a transformed code;

encoding the original code and the transformed code by the terminal apparatus into a recognition code;

transmitting the recognition code by the terminal apparatus to the wireless bridging apparatus; and verifying the recognition code by the wireless bridging apparatus, wherein a communication connection between the terminal apparatus and the wireless bridging apparatus is established when the recognition code is verified as a correct code, wherein the original code is a media access control (MAC) address, and wherein the transformed code is a product serial number.

2. The method according to claim 1, wherein the recognition code is obtained by conducting a logic operation according to the original code and the transformed code.

3. The method according to claim 2, wherein the logic operation involves an AND operator and/or an XOR operator.

4. The method according to claim 1, wherein the wireless bridging apparatus is a wireless access point.

5. The method according to claim 1, wherein the terminal apparatus is a personal computer, a mobile communication apparatus or a personal digital assistant (PDA).

6. A wireless communication system, comprising:

a wireless bridging apparatus conducting a wireless function, wherein the wireless bridging apparatus has an original code and a verification code, and transmits the original code in a wireless transmitting manner; and a terminal apparatus having a wireless communication module, wherein the wireless communication module receives the original code outputted from the wireless bridging apparatus, wherein the terminal apparatus encodes the original code into a transformed code, and encodes the original code and the transformed code into a recognition code, and the recognition code is transmitted to the wireless bridging apparatus through the wireless communication module, and wherein the original code is a media access control (MAC) address, and wherein the transformed code is a product serial number.

7. The wireless communication system according to claim 6, wherein the terminal apparatus conducts a logic operation according to the original code and the transformed code to obtain the recognition code.

8. The wireless communication system according to claim 7, wherein the logic operation involves an AND operator and/or an XOR operator.

9. The wireless communication system according to claim 6, wherein the wireless bridging apparatus is a wireless access point.

10. The wireless communication system according to claim 6, wherein the terminal apparatus is a personal computer, a mobile communication apparatus or a personal digital assistant (PDA).

11. The wireless communication system according to claim 6, wherein the terminal apparatus has an encoding module for encoding the original code into the transformed code, and a recognition module for encoding the original code and the transformed code into the recognition code.

12. The wireless communication system according to claim 6, wherein the wireless bridging apparatus verifies the terminal apparatus according to the recognition code and the verification code.

* * * * *